United States Patent
Robertson et al.

(10) Patent No.: US 12,449,109 B1
(45) Date of Patent: Oct. 21, 2025

(54) VEHICLE VENT PATCH SYSTEMS WITH ULTRASONIC DEVICES

(71) Applicant: FORD GLOBAL TECHNOLOGIES, LLC, Dearborn, MI (US)

(72) Inventors: Michael Robertson, West Bloomfield, MI (US); Venkatesh Krishnan, Canton, MI (US); Segundo Baldovino, Novi, MI (US); Michael Bryan VanBelle, Canton, MI (US); Aaron Bradley Johnson, Allen Park, MI (US); Frank Aust, Nordrhein Westfalen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 18/947,442

(22) Filed: Nov. 14, 2024

(51) Int. Cl.
  *F21S 45/30* (2018.01)
  *B08B 7/02* (2006.01)
  *B60S 1/56* (2006.01)

(52) U.S. Cl.
  CPC ............. *F21S 45/30* (2018.01); *B60S 1/56* (2013.01); *B08B 7/028* (2013.01)

(58) Field of Classification Search
  CPC .. F21S 45/10; F21S 45/30; F21S 45/33; F21S 45/37; F21S 45/60; G02B 27/0006; B60Q 1/0023; F21V 31/03; B60S 1/56
  USPC ........................................................ 362/547
  See application file for complete search history.

(56) References Cited

U.S. PATENT DOCUMENTS

| | | | |
|---|---|---|---|
| 8,899,761 B2 | 12/2014 | Tonar et al. | |
| 9,120,418 B2 | 9/2015 | Tatara et al. | |
| 9,982,857 B2 | 5/2018 | Dalal | |
| 10,101,580 B2 | 10/2018 | Mouri et al. | |
| 10,520,723 B2 * | 12/2019 | Cohen | B08B 13/00 |
| 2009/0268475 A1 | 10/2009 | Ball et al. | |
| 2016/0158678 A1 | 6/2016 | Ishii et al. | |
| 2016/0170203 A1 * | 6/2016 | Weigert | G02B 27/0006 134/1 |
| 2023/0124469 A1 * | 4/2023 | Jackl | B60S 1/02 359/507 |
| 2024/0157899 A1 | 5/2024 | Glatter et al. | |

FOREIGN PATENT DOCUMENTS

| | | | |
|---|---|---|---|
| CN | 104930424 | * | 9/2015 |
| KR | 102058425 B1 | | 12/2019 |

* cited by examiner

*Primary Examiner* — Thomas M Sember
(74) *Attorney, Agent, or Firm* — Vichit Chea; Carlson, Gaskey & Olds, P.C.

(57) ABSTRACT

Vent patch systems are provided for motor vehicles. The vent patch systems may be configured for ultrasonically cleaning a vent patch of a vehicle component, thereby preserving/restoring air circulation through the vehicle component and reducing condensation build-up. An exemplary vent patch system may include a vent patch and an ultrasonic device. The ultrasonic device can be controlled to induce movement (e.g., vibration) of the vent patch in order to remove dirt and other debris that could otherwise inhibit proper air circulation through the vehicle component.

20 Claims, 5 Drawing Sheets

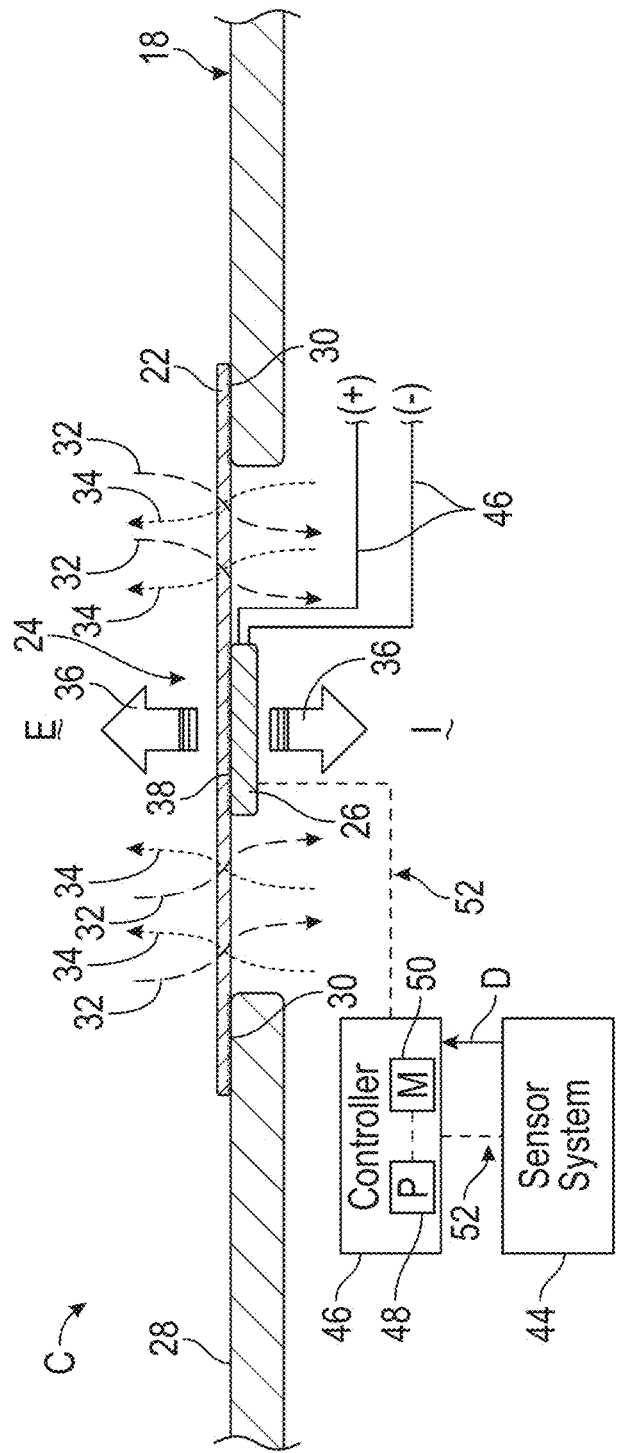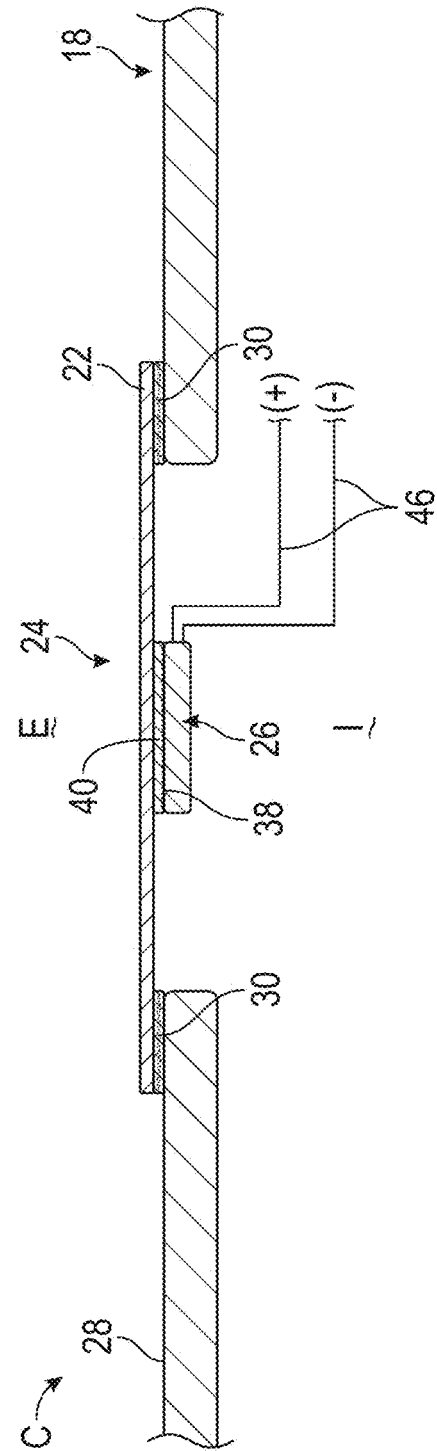

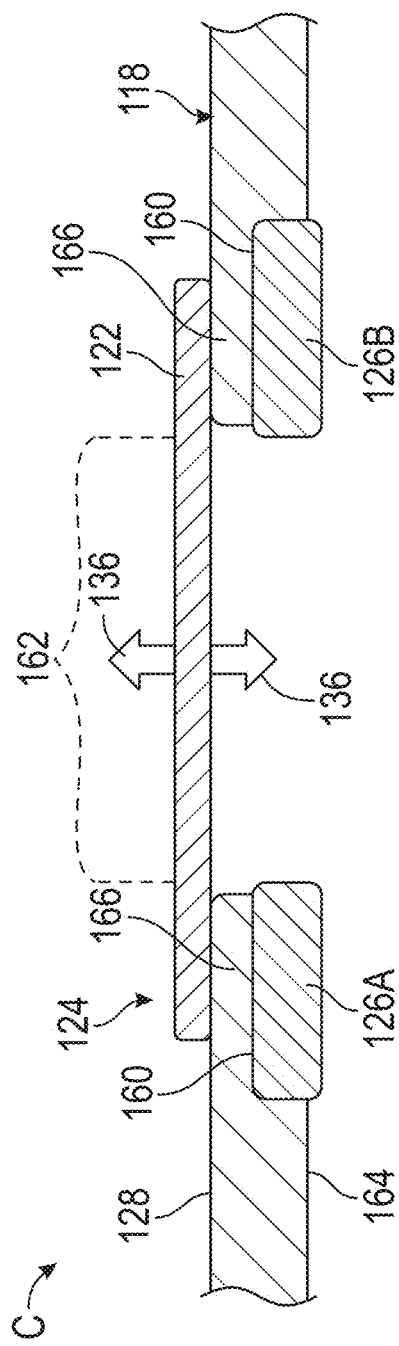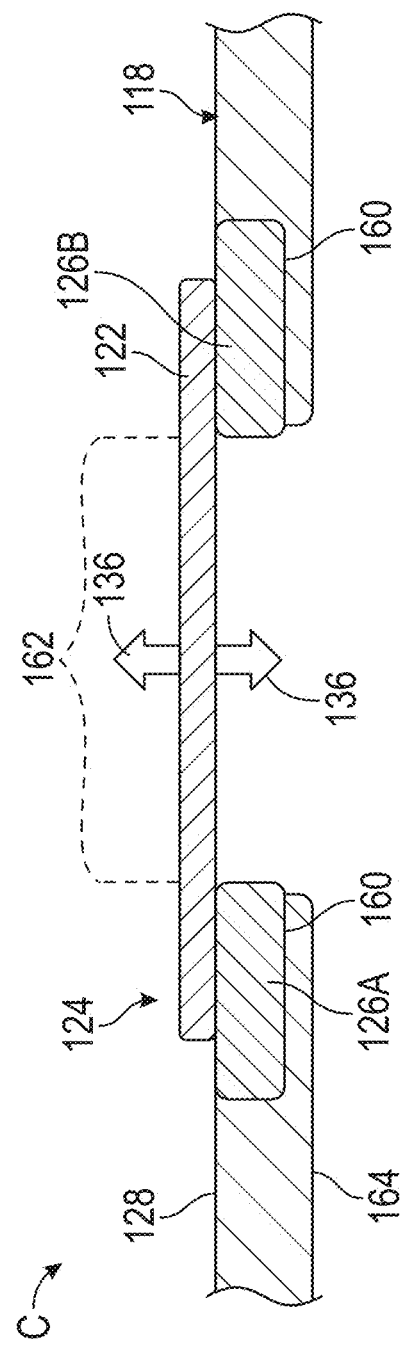

VEHICLE VENT PATCH SYSTEMS WITH ULTRASONIC DEVICES

TECHNICAL FIELD

This disclosure relates generally to motor vehicles, and more particularly to ultrasonic vent patch systems for vehicle components that require vent patches for air circulation and/or pressure equalization.

BACKGROUND

Vehicle exterior lighting systems include front and rear lamp assemblies that are configured to illuminate the surrounding areas of the vehicle. These front and rear lamp assemblies may naturally experience moisture, heat, and condensation conditions.

SUMMARY

A motor vehicle according to an exemplary aspect of a present disclosure includes, among other things, a vehicle component including a vent patch, and an ultrasonic device arranged to induce vibration for cleaning the vent patch.

In a further non-limiting embodiment of the foregoing motor vehicle, the vehicle component is a lamp assembly of an exterior lighting system of the motor vehicle.

In a further non-limiting embodiment of either of the foregoing motor vehicles, the ultrasonic device is an piezoelectric transducer.

In a further non-limiting embodiment of any of the foregoing motor vehicles, the ultrasonic device is mounted directly to the vent patch.

In a further non-limiting embodiment of any of the foregoing motor vehicles, an adhesive mounts the ultrasonic device to the vent patch.

In a further non-limiting embodiment of any of the foregoing motor vehicles, the ultrasonic device is mounted to an intermediate structure extending between the vent patch and the ultrasonic device.

In a further non-limiting embodiment of any of the foregoing motor vehicles, the intermediate structure is a cross-vent support arm of a housing of the vehicle component.

In a further non-limiting embodiment of any of the foregoing motor vehicles, a sensor system is configured to sense a parameter associated with an environment of the vehicle component.

In a further non-limiting embodiment of any of the foregoing motor vehicles, a controller is operably connected to the sensor system and is programmed to selectively command the ultrasonic device to vibrate based on sensor data from the sensor system.

In a further non-limiting embodiment of any of the foregoing motor vehicles, the sensor data includes information related to an environmental condition.

In a further non-limiting embodiment of any of the foregoing motor vehicles, the sensor system includes a rain sensor and an ambient temperature sensor.

In a further non-limiting embodiment of any of the foregoing motor vehicles, a controller is programmed to adjust an intensity of the vibration based on the parameter.

In a further non-limiting embodiment of any of the foregoing motor vehicles, the ultrasonic device is mounted within a pocket formed in an exterior surface of a housing of the vehicle component.

In a further non-limiting embodiment of any of the foregoing motor vehicles, the ultrasonic device is mounted within a pocket formed in an interior surface of a housing of the vehicle component.

A vent patch system for a motor vehicle according to another exemplary aspect of the present disclosure includes, among other things, a vent patch, and an ultrasonic device configured to selectively induce vibration of the vent patch for removing a contaminant from the vent patch.

In a further non-limiting embodiment of the foregoing vent patch systems, the ultrasonic device is mounted directly to the vent patch.

In a further non-limiting embodiment of either of the foregoing vent patch systems, the ultrasonic device is mounted to an intermediate structure extending between the vent patch and the ultrasonic device.

In a further non-limiting embodiment of any of the foregoing vent patch systems, the ultrasonic device is mounted within a pocket formed in a housing of a vehicle component that includes the vent patch.

In a further non-limiting embodiment of any of the foregoing vent patch systems, a sensor system is configured to sense a parameter associated with an environment or condition of the motor vehicle.

In a further non-limiting embodiment of any of the foregoing vent patch systems, a controller is operably connected to the sensor system and is programmed to control an intensity of the vibration based on the parameter.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 4 is a section view of a vent patch system of the lamp assembly of FIGS. 2 and 3.

FIG. 5 illustrates another exemplary vent patch system.

FIG. 9 illustrates yet another exemplary vent patch system.

FIG. 10 illustrates yet another exemplary vent patch system.

DETAILED DESCRIPTION

This disclosure describes vent patch systems for motor vehicles. The vent patch systems may be configured for ultrasonically cleaning a vent patch of a vehicle component, thereby preserving/restoring air circulation through the vehicle component and reducing condensation build-up. An exemplary vent patch system may include a vent patch and an ultrasonic device. The ultrasonic device can be controlled to induce movement (e.g., vibration) of the vent patch in order to remove dirt and other debris that could otherwise inhibit proper air circulation through the vehicle component. These and other features of this disclosure are discussed in greater detail in the following paragraphs of this detailed description.

Figure 1:
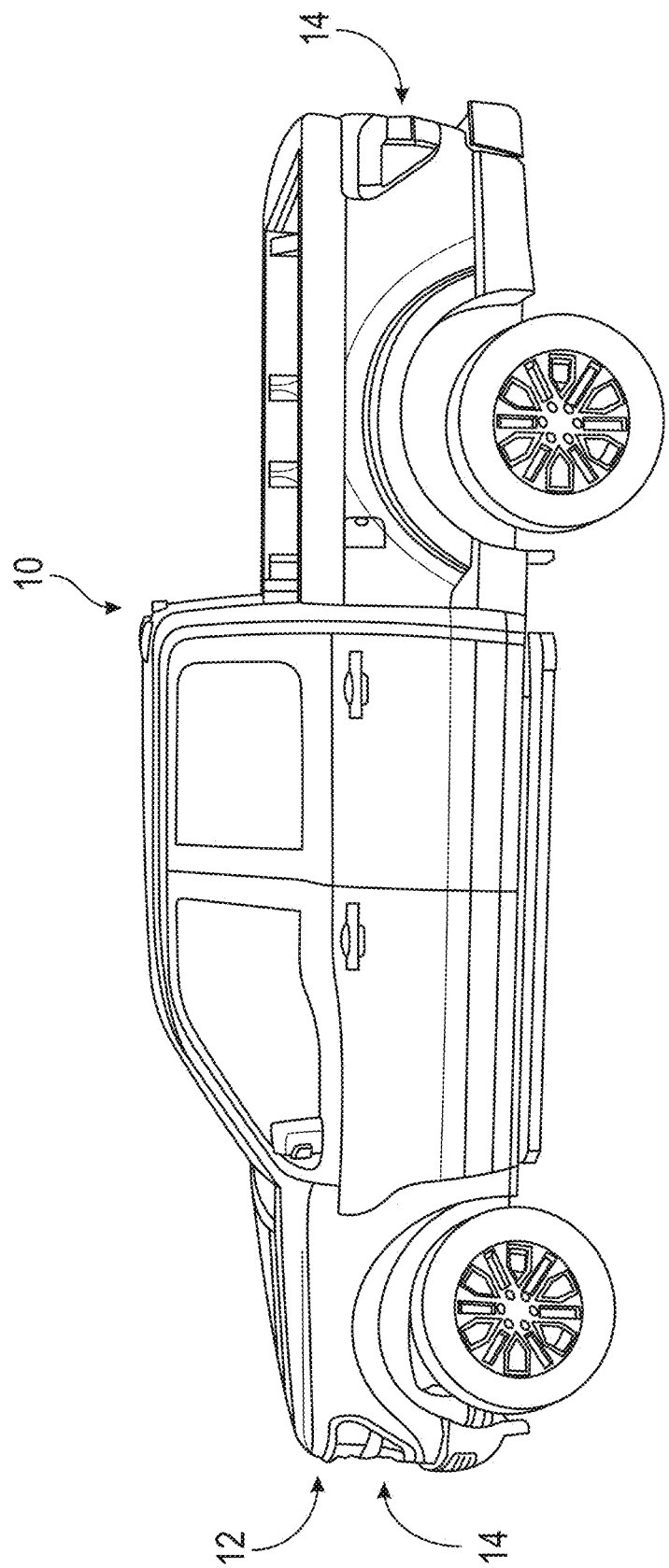
FIG. 1 schematically illustrates a motor vehicle equipped with an exterior lighting system.

FIG. 1 schematically illustrates a motor vehicle 10 (hereinafter referred to simply as "the vehicle") that includes an exterior lighting system 12. The vehicle 10 could be a pickup truck, a car, a van, a sport utility vehicle, or any other type of vehicle. Additionally, the vehicle 10 could be a conventional, internal combustion engine powered vehicle, a hybrid or plug-in hybrid vehicle, a battery electric vehicle, an autonomous vehicle (i.e., a driverless vehicle), etc.

Although a specific component relationship is illustrated in the figures of this disclosure, the illustrations are not intended to limit this disclosure. The placement and orientation of the various components of the depicted vehicles are shown schematically and could vary within the scope of this disclosure. In addition, the various figures accompanying this disclosure are not necessarily drawn to scale, and some features may be exaggerated or minimized to emphasize certain details of a particular component or system.

The exterior lighting system 12 may be configured to illuminate surrounding areas of the vehicle 10 and includes at least one lamp assembly 14. In an exemplary embodiment, the exterior lighting system 12 includes four lamp assemblies 14 (e.g., two headlamp assemblies and two taillamp assemblies). However, the exterior lighting system 12 could include any combination of front, rear, and/or side lamp assemblies for illuminating the surrounding areas of the vehicle 10.

Figure 2:
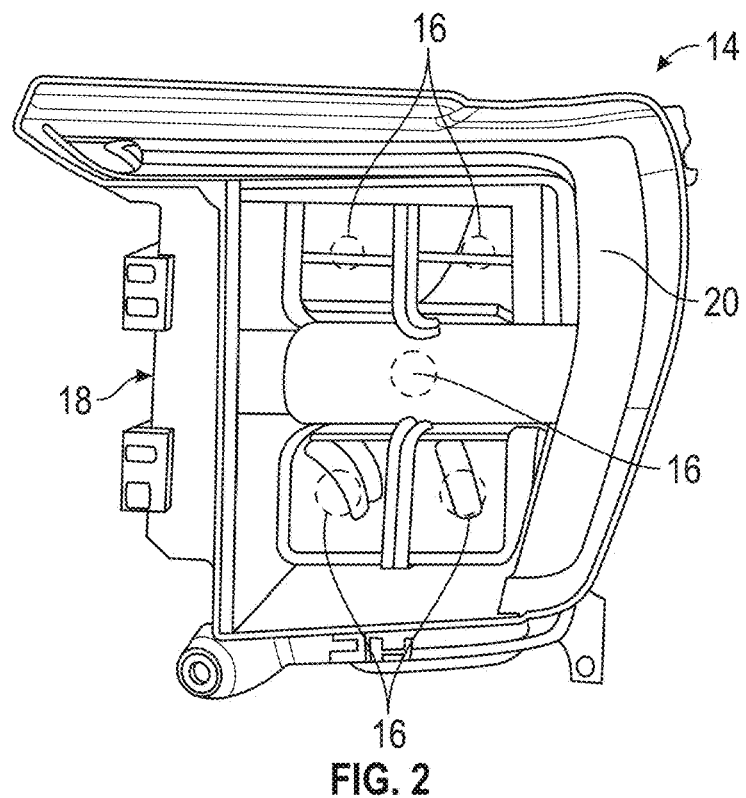
FIG. 2 is a front view of a lamp assembly of the motor vehicle of FIG. 1.
Figure 3:
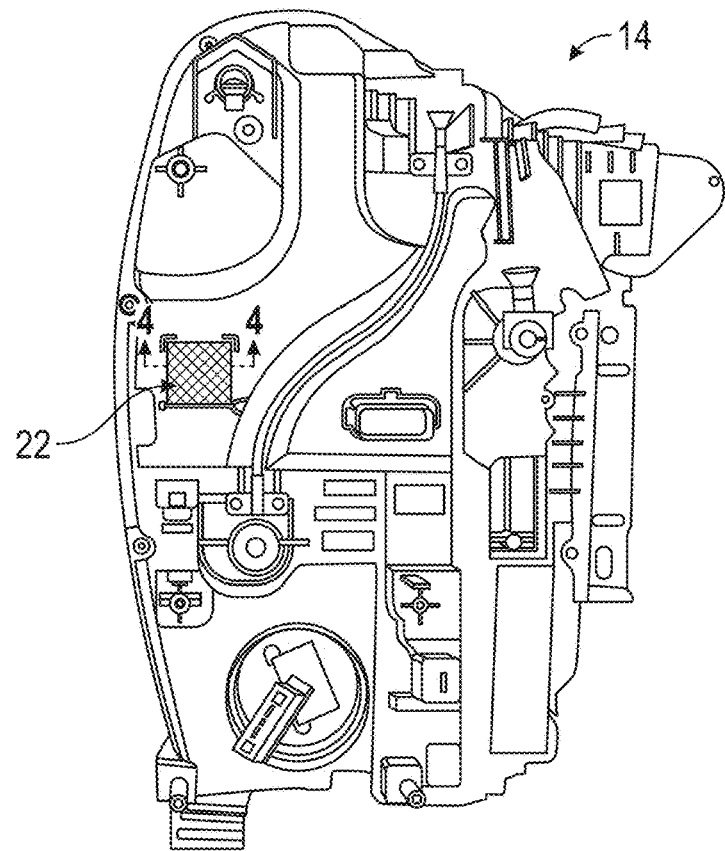
FIG. 3 is a rear view of the lamp assembly of FIG. 2.

FIGS. 2 and 3 further illustrate one of the lamp assemblies 14 of the vehicle 10 of FIG. 1. The lamp assembly 14 may include one or more light sources 16 (e.g., light-emitting diodes) enclosed within a housing 18 by an outer lens 20. The specific configuration of each of the light sources 16, the housing 18, and the outer lens 20 is not intended to limit this disclosure. It should therefore be appreciated that the lamp assembly 14 could embody any of a variety of sizes, shapes, configurations, etc.

A vent patch 22 (see FIG. 3) may be mounted to the housing 18, such as at a rear exterior surface, for example. The vent patch 22 functions to allow airflow circulation between an interior of the lamp assembly 14 and its exterior environment while blocking ingress of contaminants such as dirt, debris, moisture, etc. The vent patch 22 promotes pressure and environmental equalization, which can reduce condensation build-up within the interior of the lamp assembly 14.

The lamp assembly 14 is an exemplary type of vehicle component that can include a vent patch. However, other vehicle components of the vehicle 10 could require the use of a vent patch for achieving proper functionality. The teachings of this disclosure could therefore extend to any vehicle component that utilizes a vent patch for air circulation and/or pressure equalization.

Due to its exterior mounting location, the vent patch 22 is exposed to various environmental elements. Over time, dirt, debris, moisture, and/or other contaminants can accumulate on the vent patch 22, thereby reducing its ability to provide proper airflow circulation between the interior of the lamp assembly 14 and its exterior environment. In some instances, contaminant build-up can become so significant that naturally occurring condensation is prevented from escaping the interior of the lamp assembly 14 through the vent patch 22. Increased interior condensation can reduce the ability of the lamp assembly 14 to properly illuminate the surrounding areas of the vehicle 10. This disclosure is therefore directed to vent patch systems capable of removing dirt and/or other contaminants from the vent patch 22 in order to preserve/restore proper airflow circulation through the lamp assembly 14 (or any other vehicle component that utilizes a vent patch).

FIG. 4 illustrates features associated with an exemplary vent patch system 24 of a vehicle component C. The vehicle component C may be the lamp assembly 14 of FIGS. 2-3 or any other vehicle component that utilizes a vent patch for achieving proper air circulation and/or pressure equalization.

The vent patch system 24 may include a vent patch 22 and one or more ultrasonic devices 26. As further discussed below, each ultrasonic device 26 may be selectively controlled to induce movement (e.g., vibration) of the vent patch 22 and thereby remove contaminants and/or reduce contaminant build-up on the vent patch 22 in order to restore/preserve the ability of the vent patch 22 to provide proper airflow circulation into and out of the vehicle component C.

The vent patch 22 may be mounted to an exterior surface 28 of the housing 18. The vent patch 22 may be configured as a microporous membrane that establishes a barrier to moisture and contaminants while allowing airflow circulation between an interior I and an exterior E of the housing 18. Airflow circulation into the vehicle component C through the vent patch 22 is schematically illustrated at arrows 32 in FIG. 4, and airflow circulation out of the vehicle component C through the vent patch 22 is schematically illustrated at arrows 34 in FIG. 4.

In an embodiment, the vent patch 22 is secured to the exterior surface 28 of the housing 18 by an adhesive 30. However, other attachment methodologies are contemplated within the scope of this disclosure.

The ultrasonic device 26 may also be mounted in place using an adhesive 38. In an embodiment, the ultrasonic device 26 is mounted directly to the vent patch 22. In another embodiment, the ultrasonic device 26 is mounted to a portion of the housing 18 that aids in supporting the vent patch 22, such as to a cross-vent support arm 40 (see FIG. 5) of the housing 18, for example. In the mounted location, the ultrasonic device 26 faces toward the interior I of the vehicle component C.

In an embodiment, the ultrasonic device 26 is a piezoelectric transducer. However, other types of ultrasonic devices could be utilized within the scope of this disclosure.

The ultrasonic device 26 may be controlled to induce motion of the vent patch 22 for shaking off any contaminants that have accumulated thereon. For example, an electrical signal may be applied to the ultrasonic device 26 over electric wires 42, and the ultrasonic device 26 can convert the electrical signal to mechanical energy that ultimately causes the vent patch 22 to vibrate (schematically illustrated at arrows 36 in FIG. 4). Ultrasonic vibration of the vent patch 22 can remove contaminants such as water, dirt, and/or debris from the vent patch 22. Ultrasonic vibration of the vent patch 22 can further prevent contaminants from resting on the vent patch 22. The vent patch 22 is therefore maintained clean for preserving venting performance. The vent patch system 24 is thus configured to function as an active breathing system for promoting increased airflow communication between the interior I and the exterior E in a manner that ultimately reduces condensation build-up within the interior I of the vehicle component C.

In an embodiment, the ultrasonic device 26 may be configured to directly vibrate the vent patch 22 (see FIG. 4). In another embodiment, the ultrasonic device 26 may be configured to vibrate an intermediate structure (e.g., the cross-vent support arm 40) which will then transfer the vibrations to the vent patch 22 (see FIG. 5).

Figure 6:
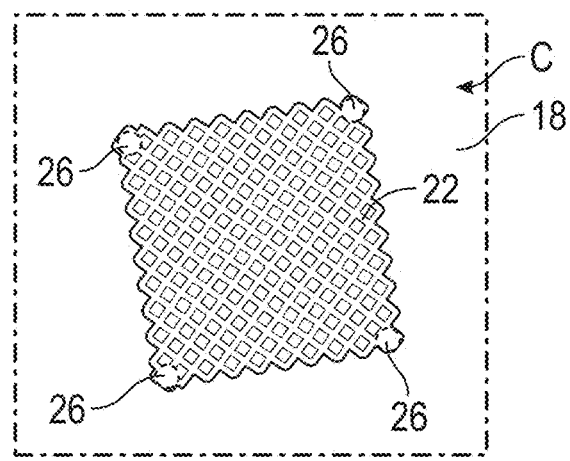
FIG. 6 illustrates another exemplary vent patch system.
Figure 7:
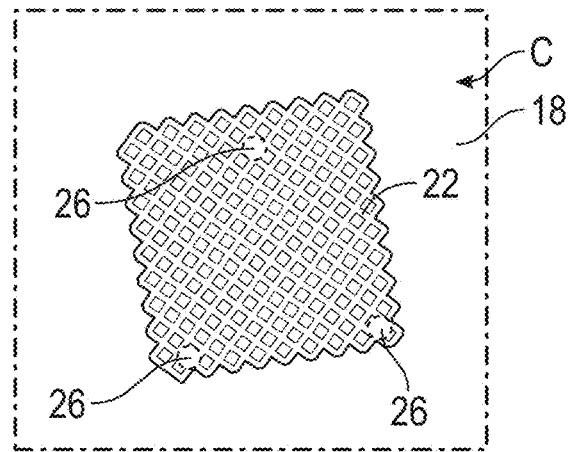
FIG. 7 illustrates another exemplary vent patch system.
Figure 8:
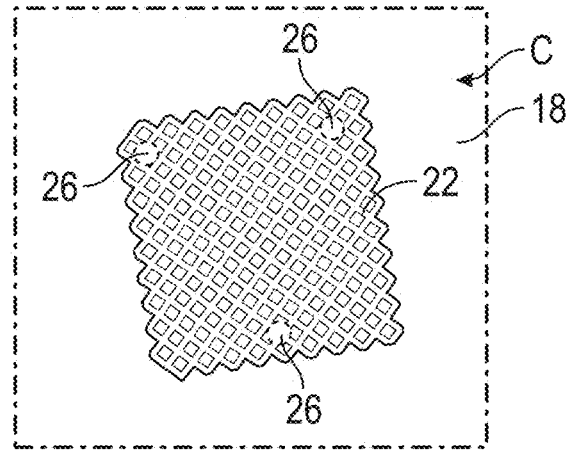
FIG. 8 illustrates another exemplary vent patch system.

In the embodiments of FIGS. 4 and 5, the vent patch system 24 is shown as including a single ultrasonic device 26. However, the vent patch system 24 could include a plurality of ultrasonic devices 26 that can be arranged in various patterns (see, e.g., the embodiments of FIGS. 6, 7, and 8) for optimizing the contaminant cleaning performance of the vent patch system 24.

The vent patch system 24 may additionally include a sensor system 44 and a controller 46 that are operably connected to one another. The sensor system 44 may include a multitude of sensors arranged and configured for monitoring various vehicle conditions and/or environmental conditions. In an embodiment, the sensor system 44 includes at least a rain sensor and an ambient air temperature sensor. However, various other sensors could be provided, including but not limited to a humidity sensor, a pressure sensor, an airflow sensor, etc.

Although schematically illustrated as a single controller, the controller 46 may be part of a vehicle control system that includes a plurality of additional control modules for interfacing with and commanding operation of the various components of the vent patch system 24. In an embodiment, the controller 46 is part of a body control module (BCM) of the vehicle 10. However, other configurations are also contemplated within the scope of this disclosure.

The controller 46 may include both hardware and software and may be programmed with executable instructions for interfacing with and commanding operation of various components of the vent patch system 24 as part of a strategy for automating the cleaning of the vent patch 22. The controller 46 may include a processor 48 and non-transitory memory 50 for executing various control strategies and modes associated with the vent patch system 24. The processor 48 may be a custom made or a commercially available processor, a central processing unit (CPU), or generally any device for executing software instructions. The memory 50 can include any one or combination of volatile memory elements and/or nonvolatile memory elements. The processor 48 may be operably coupled to the memory 50 and may be configured to execute one or more programs stored in the memory based on various inputs received from other devices associated with the vent patch system 24, such as inputs from the sensor system 44, for example.

Various subcomponents of the vent patch system 24 may be interconnected and in electronic communication with one another over one or more communication buses. For example, the ultrasonic device 26 and the sensor system 44 of the vent patch system 24 may each be operably connected to the controller 46 over a communication bus 52. In an embodiment, the communication bus 52 is a wired communication bus such as a controller area network (CAN) bus or a local interconnect network (LIN) bus, for example. In another embodiment, the communication bus 52 is a wireless communication bus such as that provided by Wi-Fi, Bluetooth®, Ultra-Wide Band (UWB), etc.

The sensor system 44 may periodically communicate sensor data D to the controller 46. The controller 46 may periodically analyze the sensor data D received from the sensor system 44 for determining whether or not to activate the ultrasonic device 26 in order to ultrasonically clean the vent patch 22.

The controller 46 may be programmed to activate the ultrasonic device 26 at different intervals and intensities based on the vehicle conditions and/or environmental conditions sensed by the sensor system 44. In general, contaminants such as rain, snow, and dust are considered to be easier to remove from the vent patch 22, and contaminants such as ice and insects are considered to be more difficult to remove from the vent patch 22. Therefore, the controller 46 be programmed to command a first electrical signal of a first, lower frequency be sent to the ultrasonic device 26 over the electric wires 42 when the sensor data D indicates rainy or snowy environmental conditions, and the controller 46 may be further programmed to command a second electrical signal of a second, higher frequency be sent to the ultrasonic device 26 over the electrical wires 42 when the sensor data D indicates icy environmental conditions. The second, higher frequency can cause the vent patch 22 to vibrate a greater amount compared to the first, lower frequency in order to rid the vent patch 22 of the harder-to-remove contaminants.

In another embodiment, the controller 46 may be programmed to command operation of the ultrasonic device 26 at a predefined frequency and for a predefined amount of time each time the vehicle windshield wipers are turned on (as sensed by the sensor system 44, for example). Regular operation of the ultrasonic device 26 in this manner can prevent contaminants such as water, snow, ice, dirt, etc. from accumulating on the surface of the vent patch 22.

In another embodiment, the controller 46 may be programmed to adjust a frequency at which the ultrasonic device 26 is controlled based on sensor data D from the sensor system 44. For example, the controller 46 may command operation of the ultrasonic device 26 via an electrical signal having an increased frequency when ambient temperatures are below a predefined threshold and at earlier times of the day. This is because the likelihood for the accumulation of condensation inside the housing 18 of the vehicle component C is greater in the morning when the sun rises and starts to heat up a relatively cool housing 18.

In yet another embodiment, the controller 46 may be programmed to command operation of the ultrasonic device 26 at a predefined frequency and for a predefined amount of time each time the vehicle 10 is parked and keyed off (as sensed by the sensor system 44, for example). Regular operation of the ultrasonic device 26 in this manner can prevent contaminants such as dirt, etc. from accumulating on the surface of the vent patch 22, thereby promoting increased airflow circulation through the housing 18 and reducing condensation build-up therein.

The above control strategies for controlling the ultrasonic device 26 in order to induce vibration of the vent patch 22 are exemplary only. The vent patch system 24 could be controlled in various other ways to restore/maintain the cleanliness of the vent patch 22.

FIGS. 9 and 10 illustrate another exemplary vent patch system 124 that can be used to maintain the operative functionality of a vent patch 122 of a vehicle component C (e.g., a vehicle lamp assembly) by selectively inducing the vent patch 122 to vibrate or otherwise move (schematically illustrated at arrows 136). The vent patch system 124 is similar to the vent patch systems discussed above, however, in this embodiment, the vent patch system 124 includes a first ultrasonic device 126A and a second ultrasonic device 126B that are each configured to induce motion of the vent patch 122 of the vent patch system 124.

The first ultrasonic device 126A and the second ultrasonic device 126B may each be positioned within a pocket 160 formed in a housing 118 of the vehicle component C. The pockets 160 may be located substantially outboard of an effective vent area 162 of the vent patch 122. Accordingly, the first and second ultrasonic devices 126A, 126B are arranged in a manner that does not reduce the effective vent area 162 of the vent patch 122.

In an embodiment, the pockets 160 are formed at an interior surface 164 of the housing 118 (see FIG. 9). In such an embodiment, a localized section 166 of reduced thickness of the housing 118 extends between the vent patch 122 and each of the first ultrasonic device 126A and the second ultrasonic device 126B. When powered, the first and second ultrasonic devices 126A, 126B can vibrate the localized sections 166, which will then transfer the vibrations to the vent patch 122.

In another embodiment, the pockets 160 are formed at an exterior surface 128 of the housing 118 (see FIG. 10). In such an embodiment, the first and second ultrasonic devices 126A, 126B can be received in direct contact with outboard sides of the vent patch 122. Accordingly, when powered, the first and second ultrasonic devices 126A, 126B can directly vibrate the vent patch 122.

The vehicle vent patch systems of this disclosure provide dedicated systems for cleaning vent patches of vehicle components. Among other benefits, the vent patch systems are capable of ultrasonically vibrating the vent patch for cleaning/preventing contaminant build-up in a manner that is sufficient to restore/maintain air circulation and reduce internal condensation. The proposed systems provide ongoing vent patch maintenance in an automated manner and without any required user input.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A motor vehicle, comprising:
a vehicle component including a vent patch; and
an ultrasonic device arranged to induce vibration of the vent patch for cleaning the vent patch.

2. The motor vehicle as recited in claim 1, wherein the vehicle component is a lamp assembly of an exterior lighting system of the motor vehicle.

3. The motor vehicle as recited in claim 1, wherein the ultrasonic device is an piezoelectric transducer.

4. The motor vehicle as recited in claim 1, wherein the ultrasonic device is mounted directly to the vent patch.

5. The motor vehicle as recited in claim 4, comprising an adhesive that mounts the ultrasonic device to the vent patch.

6. The motor vehicle as recited in claim 1, wherein the ultrasonic device is mounted to an intermediate structure extending between the vent patch and the ultrasonic device.

7. The motor vehicle as recited in claim 6, wherein the intermediate structure is a cross-vent support arm of a housing of the vehicle component.

8. The motor vehicle as recited in claim 1, comprising a sensor system configured to sense a parameter associated with an environment of the vehicle component, and further comprising a controller operably connected to the sensor system and programmed to selectively command the ultrasonic device to vibrate based on sensor data from the sensor system.

9. The motor vehicle as recited in claim 8, wherein the sensor data includes information related to an environmental condition.

10. The motor vehicle as recited in claim 9, wherein the sensor system includes a rain sensor and an ambient temperature sensor.

11. The motor vehicle as recited in claim 8, wherein the controller is further programmed to adjust an intensity of the vibration based on the parameter.

12. The motor vehicle as recited in claim 1, wherein the ultrasonic device is mounted within a pocket formed in an exterior surface of a housing of the vehicle component.

13. The motor vehicle as recited in claim 1, wherein the ultrasonic device is mounted within a pocket formed in an interior surface of a housing of the vehicle component.

14. The motor vehicle as recited in claim 1, wherein the vent patch is a microporous membrane that establishes a barrier between an interior and an exterior of a housing of the vehicle component.

15. A vent patch system for a motor vehicle, comprising:
a vent patch; and
an ultrasonic device configured to selectively induce vibration of the vent patch for removing a contaminant from the vent patch.

16. The vent patch system as recited in claim 15, wherein the ultrasonic device is mounted directly to the vent patch.

17. The vent patch system as recited in claim 15, wherein the ultrasonic device is mounted to an intermediate structure extending between the vent patch and the ultrasonic device.

18. The vent patch system as recited in claim 15, wherein the ultrasonic device is mounted within a pocket formed in a housing of a vehicle component that includes the vent patch.

19. The vent patch system as recited in claim 15, comprising a sensor system configured to sense a parameter associated with an environment or condition of the motor vehicle, and further comprising a controller operably connected to the sensor system and programmed to control an intensity of the vibration based on the parameter.

20. A motor vehicle, comprising:
a vehicle component including a vent patch; and
an ultrasonic device arranged to induce vibration for cleaning the vent patch, wherein the ultrasonic device is mounted directly to the vent patch by an adhesive or is mounted to a cross-vent support arm of a housing of the vehicle component.

* * * * *